United States Patent
Sauermann

(10) Patent No.: US 11,765,309 B2
(45) Date of Patent: Sep. 19, 2023

(54) VIDEO CAPTURING SUBJECT USING IR LIGHT

(71) Applicants: Sony Group Corporation, Tokyo (JP); Sony Pictures Entertainment Inc., Culver City, CA (US)

(72) Inventor: Felix Sauermann, Lawndale, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/990,267

(22) Filed: Aug. 11, 2020

(65) Prior Publication Data

US 2021/0185242 A1    Jun. 17, 2021

Related U.S. Application Data

(60) Provisional application No. 62/947,655, filed on Dec. 13, 2019.

(51) Int. Cl.
*H04N 5/272* (2006.01)
*H04N 5/262* (2006.01)
(Continued)

(52) U.S. Cl.
CPC ......... *H04N 5/272* (2013.01); *G02B 27/1006* (2013.01); *G02B 27/1066* (2013.01); *H04N 5/2621* (2013.01); *H04N 5/33* (2013.01)

(58) Field of Classification Search
CPC ........ H04N 5/272; H04N 5/2621; H04N 5/33; H04N 9/097; H04N 23/16; H04N 23/56;
(Continued)

(56) References Cited

U.S. PATENT DOCUMENTS 5,404,013 A * 4/1995 Tajima ............... H04N 5/23293
250/201.4
8,055,073 B1   11/2011 Flagg et al.
(Continued)

FOREIGN PATENT DOCUMENTS

CN    106446873 A    2/2017
CN    108168455 A    6/2018
(Continued)

OTHER PUBLICATIONS

Paul Debevec et al., A Lighting Reproduction Approach to Live-Action Compositing, University of Southern California Institute for Creative Technologies, SIGGRAPH 2002, San Antonio, Jul. 21-26, 2020, 10 pages.

*Primary Examiner* — Antoinette T Spinks
(74) *Attorney, Agent, or Firm* — Procopio, Cory, Hargreaves & Savitch LLP

(57) ABSTRACT

Video capture of a subject, including: capturing video data of the subject using a first camera; capturing infrared (IR) video data of the subject using a second camera linked to the first camera, in such a manner that the first and second camera share the same field of view, wherein the second camera is sensitive to IR light for capturing the IP video data of the subject; illuminating the subject with at least one IR light source; and processing the video data from the first camera and the IR video data from the second camera to identify an outline of the illuminated subject in the video data using the IR video data.

13 Claims, 3 Drawing Sheets

(51) Int. Cl.
  *G02B 27/10*  (2006.01)
  *H04N 5/33*  (2023.01)

(58) Field of Classification Search
  CPC .. G02B 27/1006; G02B 27/1066; G06T 7/12; G06T 7/194
  See application file for complete search history.

(56) References Cited

U.S. PATENT DOCUMENTS

| | | | |
|---|---|---|---|
| 8,693,731 | B2 | 4/2014 | Holz et al. |
| 8,982,272 | B1 | 3/2015 | Preston |
| 9,223,404 | B1 | 12/2015 | Ivanchenko |
| 9,472,005 | B1 | 10/2016 | Marason et al. |
| 9,549,101 | B1 | 1/2017 | Brain |
| 10,097,813 | B2 | 10/2018 | Stenger et al. |
| 2008/0110115 | A1* | 5/2008 | French ............ A63B 71/04 52/311.1 |
| 2009/0002475 | A1 | 1/2009 | Jelley |
| 2013/0287257 | A1 | 10/2013 | Dedhia et al. |
| 2019/0098229 | A1 | 3/2019 | Lovemelt |
| 2019/0098230 | A1 | 3/2019 | Lovemelt |

FOREIGN PATENT DOCUMENTS

| | | |
|---|---|---|
| CN | 108513078 A | 9/2018 |
| CN | 208874628 U | 5/2019 |
| JP | H05205030 A | 8/1993 |
| JP | H10126690 A | 5/1998 |
| JP | H11072840 A | 3/1999 |
| JP | H11073491 A | 3/1999 |
| JP | 2003110921 A | 4/2003 |
| JP | 2009071789 A | 4/2009 |
| JP | 4853437 B2 | 1/2012 |
| WO | 2018081747 A1 | 5/2018 |

* cited by examiner

VIDEO CAPTURING SUBJECT USING IR LIGHT

CROSS-REFERENCE TO RELATED APPLICATIONS

This application claims the benefit of priority under 35 U.S.C. § 119(e) of U.S. Provisional Patent Application No. 62/947,655, filed Dec. 13, 2019, entitled "Depth Extraction of Subject from Background." The disclosure of the above-referenced application is incorporated herein by reference.

FIELD

The present disclosure relates to capturing video data for a subject and environment, and more specifically, to capturing the video data and extracting the subject from the environment without the need for a green screen.

BACKGROUND

In the conventional system for video production, green screens are used to extract subjects. However, the use of the green screens has disadvantages in that the result may appear artificial if the lighting is not well balanced and the process can be expensive and cumbersome.

SUMMARY

The present disclosure provides for capturing video data for a subject and environment, and extracting the subject from the environment without the need for a green screen.

In one implementation, a method for video capture of a subject is disclosed. The method includes: capturing video data of the subject using a first camera; capturing infrared (IR) video data of the subject using a second camera linked to the first camera, wherein the second camera is sensitive to IR light for capturing the IR video data of the subject; illuminating the subject with at least one IR light source; and processing the video data from the first camera and the IR video data from the second camera to identify an outline of the illuminated subject in the video data using the IR video data.

In one implementation, the first camera includes at least one RGB color camera used for image capture. In one implementation, the second camera includes at least one IR sensor for capturing the IR video data of the subject. In one implementation, the first camera is linked to the second camera by means of a beam splitter. In one implementation, the beam splitter enables the first camera and the second camera to be aligned in such a way that every pixel on the first camera also has a counterpart on the second camera. In one implementation, the method further includes positioning the at least one IR light source behind and around the subject in such a way that the at least one IR light source illuminates the back of the subject. In one implementation, the method further includes fitting walls and floor with IR absorbent material. In one implementation, the method further includes: measuring a distance from the first camera to the subject; and enhancing the identification of the outline using the distance and contrast detection.

In another implementation, a system for video capture is disclosed. The system includes: at least one camera, having a lens, for capturing video data of a subject; an encoder, connected to the lens of the at least one camera, for measuring a focus distance from the at least one camera to the subject; at least one IR sensor linked to the at least one camera, wherein the at least one IR sensor is sensitive to IR light for capturing IR video data of the subject; at least one IR light source; and a video processor connected to the at least one camera and the at least one IR sensor, the video processor configured to process the video data from the at least one camera and the IR video data from the at least one sensor, and to identify an outline of the subject in the video data using the IR video data.

In one implementation, the system further includes a beam splitter to split light coming from the subject into two so that each of the at least one camera and the at least one IR sensor has an identical field of view. In one implementation, the beam splitter is aligned in such a way that every pixel on the at least one camera has a counterpart on the at least one IR sensor. In one implementation, the at least one IR light source is positioned to illuminate the subject from behind and around the subject. In one implementation, the at least one IR light source is set up in such a way as to illuminate the back of the subject to provide a good outline of the subject. In one implementation, the system further includes IR absorbent material fitted into the walls and floor. In one implementation, the system further includes a sub-processor to enhance and separate the subject from environment using the focus distance. In one implementation, the system further includes a sub-processor to perform contrast detection at the focus distance.

In another implementation, a non-transitory computer-readable storage medium storing a computer program to capture video of a subject is disclosed. The computer program includes executable instructions that cause a computer to: capture video data of the subject using a first camera; capture IR video data of the subject using a second camera linked to the first camera, wherein the second camera is sensitive to IP light for capturing the IR video data of the subject; command at least one IR light source to illuminate the subject; and process the video data from the first camera and the IR video data from the second camera to identify an outline of the illuminated subject in the video data using the IR video data.

In one implementation, the computer-readable storage further includes executable instructions that cause the computer to command a beam splitter to split light coming from the subject into two so that each of the first camera and the second camera has an identical field of view. In one implementation, the computer-readable storage further includes executable instructions that cause the computer to: measure a focus distance from the first camera to the subject using an encoder connected to the lens of the first camera; and perform contrast detection at the focus distance. In one implementation, the computer-readable storage further includes executable instructions that cause the computer to enhance the identification of the outline using the contrast detection.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
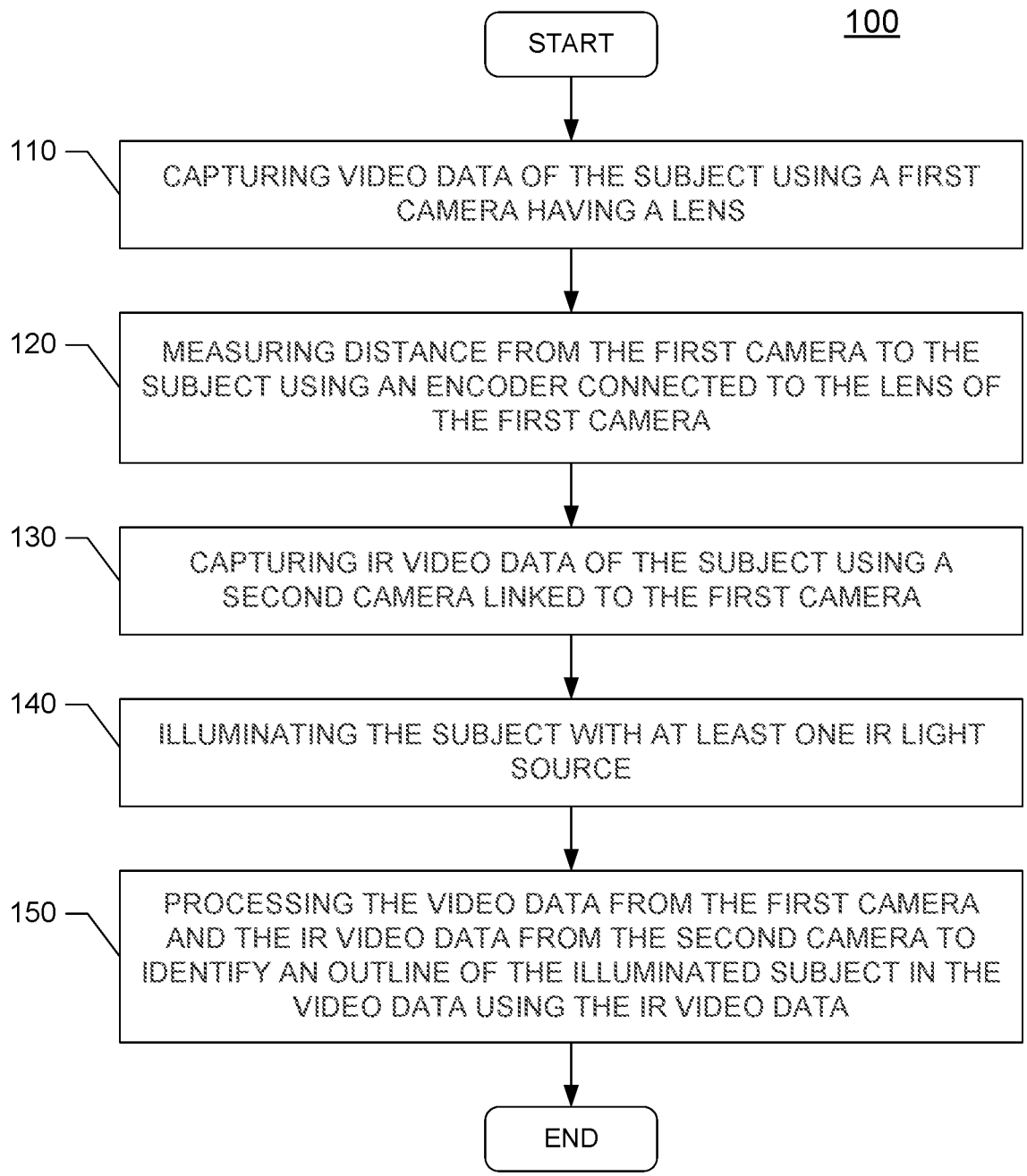
FIG. 1 is a flow diagram of a method for video capture of a subject in accordance with one implementation of the present disclosure.

As described above, the use of the green screens to extract subjects in video production has disadvantages in that the result may appear artificial if the lighting is not well balanced. Further, the process can be expensive and cumbersome.

Certain implementations of the present disclosure provide for methods and systems to implement a technique for capturing video data for a subject and environment, and extracting the subject from the environment without the need for a green screen. In one such implementation, this system uses a method that is unaffected by dynamic lighting or extreme low light situations.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a video system is used in a video production or studio environment and includes at least one camera for image capture, at least one sensor, and at least one processor to process camera data and sensor data.

In one implementation, the technique for capturing video data includes: (a) determining a focus distance from the image plane of a main capture camera to the subject in real time; (b) linking an IR sensitive camera to the main capture camera for a pixel to pixel match; (c) positioning IR light sources around and behind the subject to illuminate the subject; and (d) defining edges of and extracting the subject from the environment using the focus distance and by further defining and optimizing using software solutions.

In one implementation, part (a) of the technique for capturing video data includes measuring the real-time focus distance from the main capture camera. This can be done using an encoder on the lens of the main capture camera with an appropriate lens mapping.

In one implementation, part (b) of the technique for capturing video data includes linking a second camera only sensitive to the IR light to the main capture camera, for example by means of a beam splitter. In another implementation, the main capture camera is configured as an RGB image sensor and the second camera is configured as an IR image sensor. In one implementation, the RGB image sensor and the IR image sensor are aligned in such a way that every pixel or sensel on the RGB image sensor also has a counterpart on the IR image sensor.

In one implementation, part (c) of the technique for capturing video data includes positioning IR light sources behind and around the subject and setting up the light sources in such a way that they illuminate the subject's back to provide a good outline of the subject. That is, the subject is positioned between the cameras and the IR light source(s).

In one implementation, the walls and floor are fitted with IR absorbent material to minimize the reflections and substantially reduce IR illumination of the background. In another implementation, objects other than walls and floors may be fitted with similar properties (e.g., absorbency). For example, the objects can include curtain-like objects. In yet another implementation, surfaces of the objects can be applied with IR absorbent properties. In a further implementation, shower-curtain-like object can be placed in a desirable location to transmit visible light but block IR light. These setups may allow the edges of the subject to be clearly defined and separated from the background within the IR light spectrum.

In one implementation, part (d) of the technique for capturing video data includes enhancing the definition and separation of the subject from the environment using the focus distance along with a software solution. To aid this process, an assumption is made that the focus is on the subject and that the sharp areas of the image are also the ones with the highest amount of contrast. Thus, contrast detection (at the focus distance) and/or machine learning can be used to remove any unwanted geometry or artifacts if necessary. Therefore, using the enhanced technique described above, a high-quality IR matte can be created to separate even the hair of the subject from the background, if the image resolution is high enough.

FIG. 1 is a flow diagram of a method 100 for video capture of a subject in accordance with one implementation of the present disclosure. In the illustrated implementation of FIG. 1, video data of the subject is captured, at step 110, using a first camera having a lens. In one implementation, the first camera represents at least one RGB color camera used for image capture. The distance from the first camera to the subject is measured, at step 120, using an encoder connected to the lens of the first camera.

In one implementation, IR video data of the subject is then captured, at step 130, using a second camera linked to the first camera. In one implementation, the second camera is sensitive to the IR light and represents at least one IP sensor for capturing the IP video data of the subject. In one implementation, the first camera is linked to the second camera by means of a beam splitter. In one implementation, the first camera and the second camera are aligned in such a way that every pixel or sensel on the first camera also has a counterpart on the second camera.

In one implementation, the subject is illuminated, at step 140, with at least one IR light source. This step may further include positioning IR light sources behind and around the subject and setting up the light sources in such a way that they illuminate the subject's back to provide a good outline of the subject. That is, the subject is positioned between the cameras and the IR light source(s). The walls and floor are fitted with IR absorbent material to minimize the reflections. Thus, this setup allows the edges of the subject to be clearly defined and separated from the background within the IR light spectrum.

At step 150, the video data from the first camera and the IR video data from the second camera are processed (e.g., using at least one processor) to identify an outline of the illuminated subject in the video data using the IR video data. This step may further include enhancing the definition and separation of the subject from the environment using the focus distance and a software solution. To aid this process, an assumption is made that the focus is on the subject and that the sharp areas of the image are also the ones with the highest amount of contrast. Thus, contrast detection and/or machine learning can be used to remove any unwanted geometry or artifacts if necessary. Therefore, using the enhanced technique described above, a high-quality IR matte can be created to separate even the hair of the subject from the background, if the image resolution is high enough.

Figure 2:
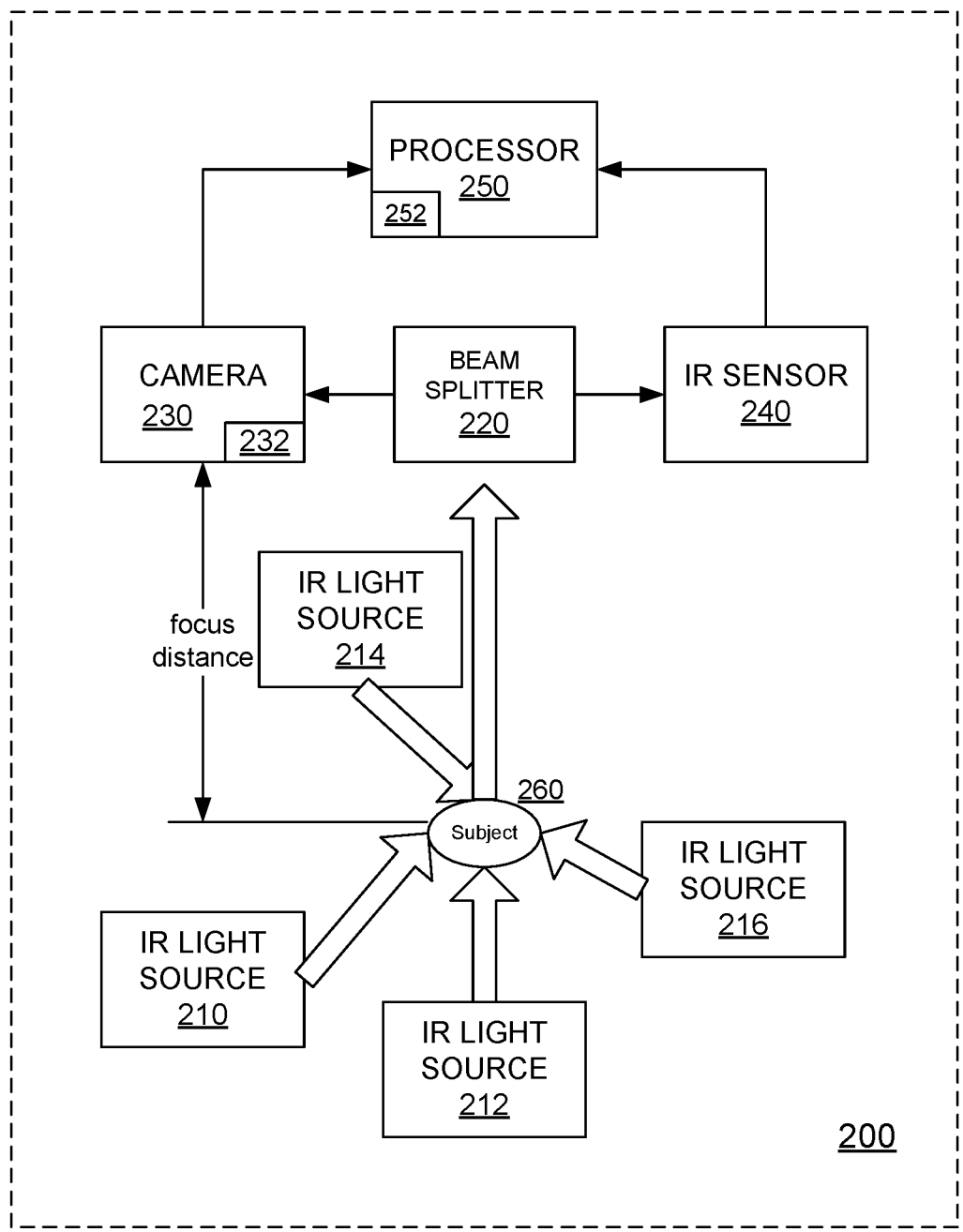
FIG. 2 is a block diagram of a system for video capture of a subject in accordance with one implementation of the present disclosure.

FIG. 2 is a block diagram of a system 200 for video capture of a subject in accordance with one implementation of the present disclosure. In the illustrated implementation of FIG. 2, the system 200 includes at least one camera 230, at least one IR sensor 240, at least one IR light source 210, 212, 214, 216 and a processor 250.

In one implementation, the camera 230 captures the video data of the subject. The camera 230 includes a lens. In one implementation, an encoder 232 connected to the lens of the camera 230 is used to measure the focus distance from the image plane of the camera 230 to the subject 260. In one implementation, the IR sensor 240 is linked to the camera 230, and is used to capture the IR video data of the subject 260. In one implementation, the camera 230 is linked to the IR sensor 240 by means of a beam splitter 220. The beam splitter 220 splits the light coming from the subject 260 into two so that each of the camera 230 and the IR sensor 240 has an identical field of view. In one implementation, the camera 230 and the IR sensor 240 are aligned in such a way that every pixel on the camera 230 also has a counterpart on the IR sensor 240.

In one implementation, the IR light sources 210, 212, 214, 216 illuminate the subject from behind and around the subject including from the front of the subject (see light source 214 in FIG. 2). The light sources 210, 212, 214, 216 are set up in such a way that they illuminate the subject's back to provide a good outline of the subject. That is, the subject may be positioned between the camera/sensor 230, 240 and the IR light sources 210, 212, 214, 216. The walls and floor are fitted with IR absorbent material to minimize the reflections. Thus, this setup allows the edges of the subject to be clearly defined and separated from the background within the IR light spectrum.

In one implementation, the processor 250 processes the video data from the camera 230 and the IR video data from the IR sensor 240 to identify an outline of the illuminated subject (in the video data using the IR video data). The measured focus distance is used to enhance the definition and separation of the subject from the environment. In one implementation, the processor 250 includes a sub-processor 252 to work on the enhancement and separation of the subject from the environment using the focus distance. To aid this process, an assumption is made that the focus is on the subject and that the sharp areas of the image are also the ones with the highest amount of contrast. Thus, in one implementation, the sub-processor 252 performs contrast detection at the focus distance. The sub-processor 252 may also perform machine learning to remove any unwanted geometry or artifacts if necessary.

Figure 3A:
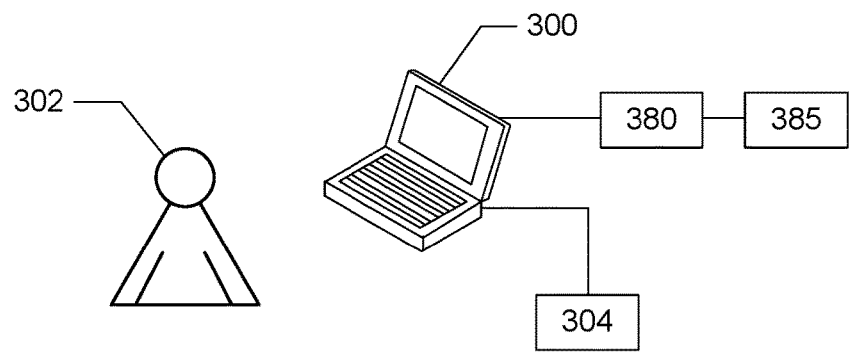
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an application 390 for subject extraction as illustrated and described with respect to the method 100 in FIG. 1 and the system 200 in FIG. 2.

Figure 3B:
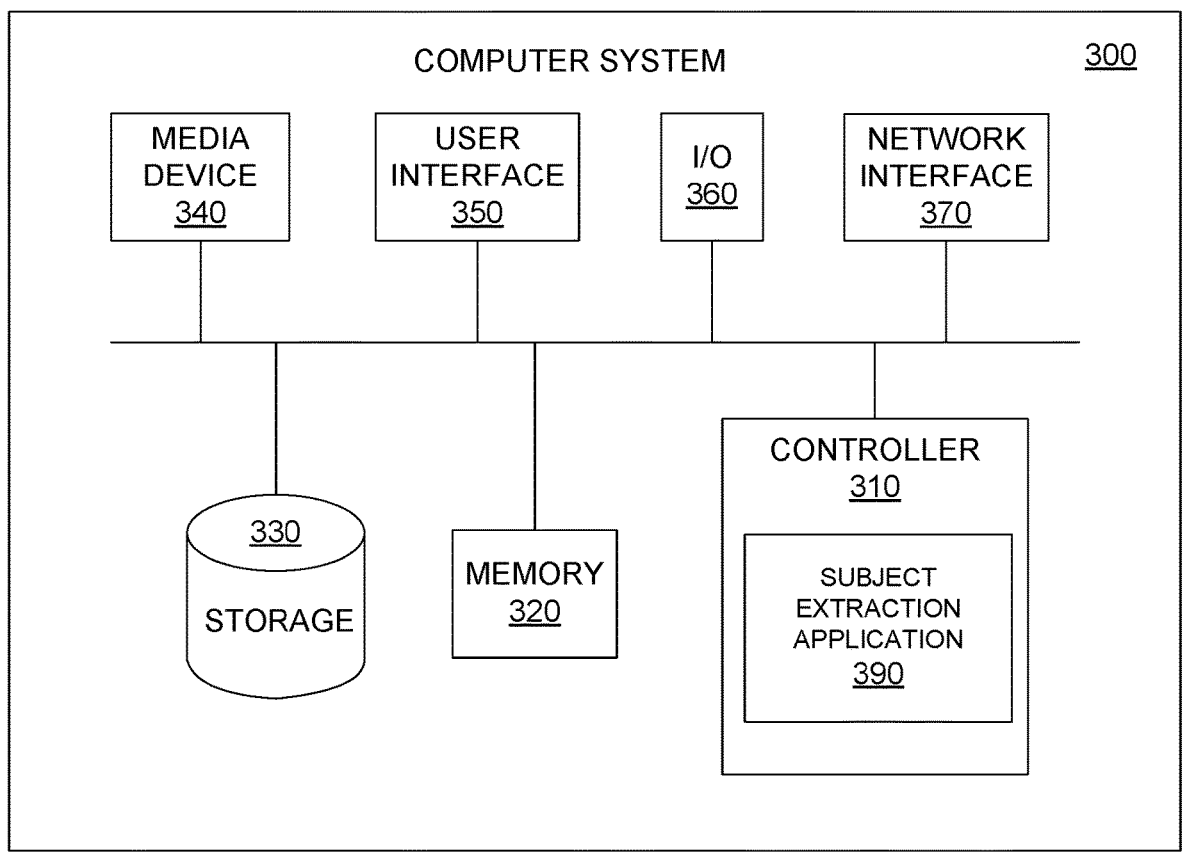
FIG. 3B is a functional block diagram illustrating the computer system hosting the subject extraction application in accordance with an implementation of the present disclosure.

The computer system 300 stores and executes the subject extraction application 390 of FIG. 3B. In addition, the computer system 300 may be in communication with a software program 304. Software program 304 may include the software code for the subject extraction application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the subject extraction application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the subject extraction application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing to capture video data for the subject and environment. In its execution, the controller 310 provides the subject extraction application 390 with a software system, such as to extract the subject from the environment without the need for a green screen. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the subject extraction application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, in addition to the video production, implementations of the system and methods can be applied and adapted for other applications, such as movies for live pre-visualization and post-visualization, television shows for live pre-visualization and post-visualization, broadcast in any studio environment, and virtual productions in general.

Other variations are possible. For example, a subject for video capture is fitted with a device that allows the system to track the focus distance from the image plane at all times. Alternatively, the focus distance is measured separately entirely. This separate measurement allows for main camera focus control independent of the subject IR key extraction. Additional variations and implementations are also possible. For example, in addition to video production for movies or television, implementations of the system and methods can be applied and adapted for other applications, such as virtual production (e.g., virtual reality environments), broadcast video (e.g., sports, weather, etc.), video or image capture typically using a green screen or chroma key, or using a green screen for some situations/scenes and not for others. In some implementations, removing a green screen allows for more priority to be placed on dynamic and/or dramatic lighting that would otherwise be limited when working with a green screen. Accordingly, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for video capture of a subject from environment without a green screen using at least a main capture camera and an infrared (IR) sensitive camera, the method comprising:
   determining a distance of focus from the main capture camera to the subject in real time;
   linking the IR sensitive camera to the camera for a pixel to pixel match;
   positioning at least one IR light source behind and around the subject in such a way that the back of the subject is illuminated;
   illuminating the subject with the at least one IR light source to provide an outline of the subject;
   defining the outline of and extracting the subject from the environment using the distance of focus and aided by the illumination of the subject with the at least one IR light source; and
   enhancing the outline using contrast detection to detect areas with a highest amount of contrast as areas occupied by the subject.

2. The method of claim 1, wherein the main capture camera includes at least one RGB color camera used for image capture.

3. The method of claim 1, wherein the IR sensitive camera includes at least one IR sensor for capturing the IR video data of the subject.

4. The method of claim 1, wherein the main capture camera is linked to the IR sensitive camera by means of a beam splitter.

5. The method of claim 4, wherein the beam splitter enables the main capture camera and the IR sensitive camera to be aligned in such a way that every pixel on the main capture camera also has a counterpart on the IR sensitive camera.

6. The method of claim 1, further comprising fitting walls and floors of the environment with IR absorbent material.

7. A system for video capture of a subject from environment without a green screen, the system comprising:
   at least one camera, having a lens, for capturing video data of the subject in the environment, wherein the environment also includes walls and floors;
   an encoder, connected to the lens of the at least one camera, for determining a focus distance from the at least one camera to the subject;
   at least one IR sensor linked to the at least one camera, wherein the at least one IR sensor is sensitive to IR light for a pixel to pixel match and for capturing IR video data of the subject;
   at least one IR light source positioned behind and around the subject in such a way that the back of the subject is illuminated to provide an outline of the subject; and
   a video processor connected to the at least one camera and the at least one IR sensor, the video processor configured to process the video data from the at least one camera and the IR video data from the at least one sensor, to define the outline of and extract the subject in the video data from the environment using the IR video data, and to enhance the outline using contrast detection to detect areas with a highest amount of contrast as areas occupied by the subject.

8. The system of claim 7, further comprising
a beam splitter to split light coming from the subject into two so that each of the at least one camera and the at least one IR sensor has an identical field of view.

9. The system of claim 8, wherein the beam splitter is aligned in such a way that every pixel on the at least one camera has a counterpart on the at least one IR sensor.

10. The system of claim 7, further comprising
IR absorbent material fitted into the walls and the floors.

11. The system of claim 7, further comprising
a sub-processor to enhance and separate the subject from the environment using the focus distance.

12. A non-transitory computer-readable storage medium storing a computer program to capture video of a subject from environment without a green screen using at least a main capture camera and an infrared (IR) sensitive camera, the computer program comprising executable instructions that cause a computer to:
   determine a distance of focus from the main capture camera to the subject in real time;
   link the IR sensitive camera to the camera for a pixel to pixel match;
   position at least one IR light source behind and around the subject in such a way that the back of the subject is illuminated;
   illuminate the subject with the at least one IR light source to provide an outline of the subject;

define the outline of and extract the subject from the environment using the distance of focus and aided by the illumination of the subject with the at least one IR light source; and enhance the outline using contrast detection: to detect areas with a highest amount of contrast as areas occupied by the subject.

13. The computer-readable storage medium of claim 12, further comprising executable instructions that cause the computer to command a beam splitter to split light coming from the subject into two so that each of the first camera and the second camera has an identical field of view.

\* \* \* \* \*